United States Patent
Konishi et al.

(10) Patent No.: US 8,536,274 B2
(45) Date of Patent: Sep. 17, 2013

(54) PAINT COMPOSITION AND PAINTED OBJECTS

(75) Inventors: Tetsu Konishi, Kanagawa (JP); Shinji Mitsumune, Kanagawa (JP); Masayuki Takemoto, Yokohama (JP); Takehito Ito, Tokyo (JP); Hiroyuki Tagkagi, Yokohama (JP); Rui Nimi, Munster (DE)

(73) Assignee: BASF Coatings Japan Ltd. (JP)

( * ) Notice: Subject to any disclaimer, the term of this patent is extended or adjusted under 35 U.S.C. 154(b) by 0 days.

(21) Appl. No.: 11/995,405

(22) PCT Filed: Jul. 3, 2006

(86) PCT No.: PCT/IB2006/001853
§ 371 (c)(1),
(2), (4) Date: Jan. 11, 2008

(87) PCT Pub. No.: WO2007/007146
PCT Pub. Date: Jan. 18, 2007

(65) Prior Publication Data
US 2008/0227915 A1 Sep. 18, 2008

(30) Foreign Application Priority Data
Jul. 12, 2005 (JP) ................. 2005-202990

(51) Int. Cl.
*C08F 8/30* (2006.01)
*C08L 75/06* (2006.01)

(52) U.S. Cl.
USPC ........................................................ 525/123

(58) Field of Classification Search
USPC ........................................................ 525/123
See application file for complete search history.

(56) References Cited

U.S. PATENT DOCUMENTS

| | | | |
|---|---|---|---|
| 6,436,531 B1 * | 8/2002 | Kollaja et al. | 428/355 R |
| 6,652,971 B1 * | 11/2003 | Delmotte et al. | 428/413 |
| 6,740,365 B2 * | 5/2004 | Awokola et al. | 427/512 |
| 7,019,082 B2 * | 3/2006 | Matyjaszewski et al. | 525/268 |
| 7,235,591 B2 * | 6/2007 | Tsunoda et al. | 522/107 |
| 7,288,290 B2 * | 10/2007 | Chao et al. | 427/407.1 |
| 2002/0082341 A1 | 6/2002 | Matsuno et al. | |
| 2003/0119980 A1 | 6/2003 | Ogawa et al. | |

FOREIGN PATENT DOCUMENTS

| | | |
|---|---|---|
| EP | 1464674 A | 10/2004 |
| WO | WO 03080745 A1 * | 10/2003 |

OTHER PUBLICATIONS

Bandrup et al. J. Bandrup. E.H. Immergut. Polymer Handbook, second edition. Jul. 1979. Evidentiary reference.*
International Search Report for PCT/IB2006/001853 dated Mar. 26, 2007.

* cited by examiner

*Primary Examiner* — Mike M Dollinger
(74) *Attorney, Agent, or Firm* — Cantor Colburn LLP

(57) ABSTRACT

Disclosed herein is a clear paint composition, comprising (A) an acrylic copolymer comprising from 35 to 50 wt % ε-caprolactone structural units, based on the resin solid fraction, and wherein the hydroxyl number is from 200 to 340 mgKOH/g and the weight average molecular weight is from 5,000 to 15,000 and (B) a non-yellowing type polyisocyanate compound, wherein the isocyanate group of the (B) component is included in a proportion of from 0.5 to 2 equivalents per 1 equivalent of hydroxyl group of the (A) component, wherein the Young's modulus of the hardened paint film obtained from said paint composition is not more than 1.5 Pa, wherein the molecular weight of intercrosslinking of the cured coating film (Mc) is not more than 350 g/mol, and wherein the glass transition temperature (Tg) of the hardened paint film is at least 65° C.

13 Claims, No Drawings

PAINT COMPOSITION AND PAINTED OBJECTS

This application is a National Phase Application of International Patent Application PCT/IB2006/001853, filed on Jul. 3, 2006, which claims priority to Japanese patent application JP 2005-202990, filed on Jul. 12, 2005.

TECHNICAL FIELD

This invention concerns paint compositions which can be used in fields where paint films which have excellent scratch resistance and good weather resistance and dirt-soiling resistance are required, and objects painted with said paint.

BACKGROUND

There is a need for paints for use on vehicles such as automobiles and motorcycles where the paint films have excellent solvent resistance, gasoline resistance and weather resistance without loss of the paint film hardness or appearance. In particular, paints which have a high scratch resistance have recently become important in view of the problem of the scratching of the paint film in automatic car-wash facilities.

Paint compositions which contain from 10 to 50 weight % (wt %) of a urethane polyol obtained by reacting an isocyanate compound and caprolactone polyol and of which the weight average molecular weight is from 1,500 to 4,000 and the hydroxyl group value is from 50 to 180 mgKOH/g, from 30 to 80 wt % of fluorinated resin copolymer in which fluoroolefin has been reacted as an essential raw material component and of which the hydroxyl group value is from 50 to 150 mgKOH/g and from 10 to 40 wt % crosslinking agent are known as paint compositions where scratch resistance is imparted to the paint film and which provide paint films with which the initial water-repelling properties are maintained (for example, Japanese Unexamined Patent Application Laid Open H5-051556). However, these paint compositions have a weakness in that the wettability of a water-based base-coat is reduced by the water-repelling properties of the fluorinated resin copolymer.

Furthermore, paint compositions which are characterized by containing as a hardenable resin composition (A) from 90 to 50 wt % of acrylic copolymer of hydroxyl group value from 60 to 140 mgKOH/g and weight average molecular weight from 3,000 to 30,000 constructed with styrene monomer, monomer which includes 1,4-butanediol mono-acrylate monomer and/or ε-caprolactone modified acrylate monomer as hydroxy group-containing mono-acrylate monomer, and acrylic acid ester monomer of primary alcohol which has from 4 to 24 carbon atoms and of which said styrene monomer content is from 45 to 55 wt %, and (B) from 10 to 50 wt % amino resin and/or (blocked) polyisocyanate compound are known as top-coat paints for automobile painting purposes which have excellent acid resistance, weather resistance and scratch resistance (for example, Japanese Unexamined Patent Application Laid Open H5-320562). However, these paint compositions have a weakness in that the dirt-soiling resistance is reduced since the glass transition point (Tg) of the paint film is low because an amount of 1,4-butanediol mono-acrylate monomer with which the scratch resistance is satisfactory is used.

Furthermore, an ultraviolet-hardening type paint composition which contains (A) ultraviolet hardenable polyfunctional (meth)acrylate of functionality at least 4 of number average molecular weight from 300 to 2,000 which has in one molecule at least four (meth)acryloyl groups, (B) lactone modified polyhydric alcohol mono(meth)acrylate polymer which contains from 20 to 60 wt % ring-opened ε-caprolactone adduct and of which the hydroxyl group value originating from the lactone modification is from 100 to 180 mgKOH/g and (C) non-yellowing type polyisocyanate compound in which in respect of the total amount of the (A), (B) and (C) components there is from 10 to 50 wt % of the (A) component and from 90 to 50 wt % of the (B) and (C) components and in which there are from 0.5 to 1.5 equivalents of (C) component isocyanate group per 1 hydroxyl group equivalent of the (B) component, and which also contains (D) photo-stabilizer and (E) photo-polymerization initiator which is characterized in that the Knoop hardness of the hardened paint film obtained from said ultraviolet-hardening type paint composition is from 10 to 18 and the molecular weight between crosslinks of the hardened paint film is from 150 to 300, is known as an ultraviolet-hardenable paint which has excellent scratch resistance, which has a beautiful appearance and which has good adhesion properties and gasoline resistance (for example, Japanese Unexamined Patent Application Laid Open 2003-277684).

However, these paint compositions have a weakness in that ultraviolet radiation must be used for the hardening reaction.

Furthermore, (A) pre-polymers which have difunctional and/or trifunctional terminal NCO groups which have been obtained by reacting an aliphatic diisocyanate or alicyclic diisocyanate with a polycaprolactone diol and/or triol of number average molecular weight from 500 to 1,500 and then essentially removing the unreacted aliphatic diisocyanate or alicyclic and diisocyanate and (B) acrylic polyols of glass transition point from 30 to 100° C. which have a hydroxyl group value of from 10 to 150 mgKOH/g based on the resin, in an NCO/OH equivalent ratio of from 0.5 to 2.0 are known to form two-liquid type polyurethane paint films which provide excellent scratch resistance to acrylic moldings. (For example, Japanese Unexamined Patent Application Laid Open H11-042746) However, these paint compositions have a weakness in that the paint film retains a tacky feel because a film which is extensible is formed.

SUMMARY

The invention is intended to provide paint compositions with which paint films which have excellent car-wash damage resistance, dirt-soiling resistance and weather resistance can be obtained, and painted objects As a result of carrying out thorough research with a view to resolving the abovementioned problems, the inventors have discovered that these aims can be achieved by using a paint composition which contains acrylic copolymer which includes a specified amount of ring-opened ε-caprolactone adduct and non-yellowing type polyisocyanate compound, and the invention is based upon these findings.

That is to say, this invention is a paint composition which contains (A) acrylic copolymer which includes in the resin solid fraction from 35 to 50 wt % ε-caprolactone structural units and of which the hydroxyl group value is from 200 to 340 mgKOH/g and the weight average molecular weight is from 5,000 to 15,000 and (B) non-yellowing type polyisocyanate compound, and it provides a clear paint composition which is characterized in that the isocyanate group of the (B) component is included in a proportion of from 0.5 to 2 equivalents per 1 equivalent of hydroxyl group of the (A) component, the Young's modulus of the hardened paint film obtained from said paint composition is not more than 1.5 Pa, the molecular weight of intercrosslinking of the cured coating (Mc) is not more than 350 g/mol and the glass transition temperature (Tg) of the hardened paint film is at least 65° C.

Moreover, the invention provides painted objects which have been obtained by painting with the abovementioned clear paint composition.

DETAILED DESCRIPTION

The paint compositions of this invention can form paint films which have excellent scratch resistance and good weather resistance and dirt-soiling resistance.

The (A) component acrylic copolymer which is used in this invention preferably contains in the resin solid fraction from 35 to 50 wt % of ε-caprolactone structural units and has a hydroxyl group value of from 200 to 340 mgKOH/g. In those cases where there is less than 35 wt % of ε-caprolactone structural units the scratch resistance is poor, and in those cases where there is more than 50 wt % of these units the dirt-soiling resistance and the weather resistance are poor. Furthermore, if the hydroxyl group value of the (A) component acrylic copolymer is less than 200 mgKOH/g then the dirt-soiling resistance and the weather resistance are poor and if it exceeds 340 mgKOH/g then the scratch resistance and the compatibility with the (B) component non-yellowing type polyisocyanate compound are poor.

The ring-opened ε-caprolactone adduct content in the (A) component is more desirably from 37 to 47 wt %, and most desirably from 39 to 45 wt %.

Furthermore, the preferred range for the hydroxyl group value of the (A) component acrylic copolymer is from 220 to 320 mgKOH/g.

The weight average molecular weight of the (A) component acrylic copolymer is preferably within the range from 5,000 to 15,000, but it is more desirably from 7,000 to 13,000. In those cases where the weight average molecular weight is less than 5,000 the dirt-soiling resistance and the weather resistance are poor, and in those cases where it exceeds 15,000 the compatibility with the non-yellowing type polyisocyanate compound which is the (B) component is poor.

Examples of the hydroxy group-containing radically polymerizable monomers which can be used in the (A) component acrylic copolymer include 2-hydroxyethyl(meth)acrylate, 2-hydroxypropyl(meth)acrylate, 3-hydroxypropyl(meth) acrylate, 4-hydroxybutyl(meth)acrylate, polyethylene glycol mono-(meth)acrylate, polypropylene glycol mono-(meth) acrylate, neopentyl glycol mono-(meth)acrylate and glycerine mono-(meth)acrylate. The hydroxy group-containing radically polymerizable monomer used may be of one type alone, or a combination of two or more types may be used.

Examples of other copolymerizable vinyl monomers which can be used in the (A) component acrylic copolymer include (meth)acrylic acid and alkyl substituted forms thereof; alkyl(meth)acrylates such as methyl(meth)acrylate, ethyl(meth)acrylate, butyl(meth)acrylate, 2-ethylhexyl (meth)acrylate, lauryl(meth)acrylate and stearyl(meth)acrylate; esters of dibasic acids such as itaconic acid, maleic acid and fumaric acid; styrene and ring-substituted styrenes such as vinyltoluene, dimethylstyrene and ethylstyrene; (meth) acrylonitrile, (meth)acrylamide, vinyl acetate and vinyl chloride. The other copolymerizable vinyl monomer used may be of one type alone, or a combination of two or more types may be used.

Examples of the methods of bringing about the ring-opening addition of ε-caprolactone on the (A) component acrylic copolymer include (1) the method in which ε-caprolactone is caused to undergo ring-opening addition with the abovementioned hydroxy group-containing radically polymerizable monomer and used as a caprolactone modified radically polymerizable monomer in the copolymerization, (2) the method in which ε-caprolactone is added with ring-opening to the copolymer of hydroxy group-containing radically polymerizable monomer and other vinyl monomer during the copolymerization reaction or after the reaction, and (3) the method in which ε-caprolactone is added with ring-opening to a dimethylolalkanoic acid such as 2,2-dimethylolbutanoic acid and an addition reaction is carried out with a homopolymer of a mono-(meth)acrylate which has an epoxy group, such as glycidyl(meth)acrylate, or a copolymer of this with other copolymerizable vinyl monomer.

Furthermore, Praxel FA-1 (trade name, a monomer where 1 mol of ε-caprolactone has been added with ring opening to 1 mol of 2-hydroxyethyl acrylate, produced by the Daicel Chemical Industries Co.), Praxel FM-ID, Praxel FM-2D, Praxel FM-3 and Praxel FM-4) (all trade names, monomers where 1, 2, 3 or 4 mol respectively of ε-caprolactone has been added with ring opening to 1 mol of 2-hydroxyethyl methacrylate, produced by the Daicel Chemical Industries Co.) can be used as radically polymerizable monomers which have been purchased commercially as radically polymerizable monomers where ε-caprolactone has been caused to undergo ring-opening addition with a hydroxy group-containing methacrylic acid ester.

A polymerization initiator is generally used in the copolymerization of the aforementioned monomers for producing the (A) component acrylic copolymer. Examples of the polymerization initiator include organic peroxide based polymerization initiators and azo-based polymerization initiators. No particular limitation is imposed upon the amount of polymerization initiator which is used, but from 0.5 to 15 wt % with respect to the total amount of monomer is generally preferred.

Furthermore, examples of organic solvents which are suitable for use in the production of the (A) component of this invention include alicyclic hydrocarbons such as cyclohexane and ethylcyclohexane, aromatic hydrocarbon solvents such as toluene, xylene, ethylbenzene and aromatic naphtha, ketone-based solvents such as acetone, methyl ethyl ketone, methyl isobutyl ketone, cyclohexanone and isophorone, ester-based solvents such as ethyl acetate, n-butyl acetate, isobutyl acetate, 3-methoxybutyl acetate and bis(2-ethylhexyl) adipate, ether-based solvents such as dibutyl ether, tetrahydrofuran, 1,4-dioxane and 1,3,5-trioxane, and nitrogen-containing solvents such as acetonitrile, valeronitrile, N,N-dimethylformamide and N,N-diethylformamide. The organic solvent may be of one type alone, or it may be a mixed solvent comprising a plurality of two or more types. At this time the solid fraction concentration of the hydroxy group-containing resin can be selected arbitrarily within the range where the dispersion stability of the resin is not lost, but it is generally from 10 to 70 wt % as a solid fraction concentration.

Aliphatic and alicyclic polyisocyanate compounds are preferably used for the non-yellowing type polyisocyanate compound which is the (B) component which is used in this invention. Typical examples include the reaction products of hexamethylene diisocyanate and/or isophorone diisocyanate with polyhydric alcohols and/or low molecular weight polyester polyols, isocyanurates which are polymers of hexamethylene diisocyanate and/or isophorone diisocyanate, and biuret compounds which have been obtained by reacting these further with urethane bonds.

Furthermore, blocked isocyanates where the isocyanate groups in these polymers are masked with compounds which have hydroxyl groups are also preferably used. Furthermore, various non-yellowing type polyisocyanate compounds such as polymers of diisocyanate compounds other than those mentioned above can also be used. The non-yellowing type polyisocyanate compound used may be of one type alone, or a combination of two or more types may be used.

The proportions in which the (A) component and the (B) component are included in this invention are such that there are from 0.2 to 2 equivalents, preferably from 0.5 to 1.5 equivalents, and most desirably from 0.6 to 1.2 equivalents, of isocyanate group of the (B) component per 1 equivalent of hydroxyl group of the (A) component. The hardening properties are unsatisfactory with less than 0.5 equivalent of isocyanate group of the (B) component per 1 equivalent of hydroxyl group of the (A) component, and the scratch resistance declines if the amount exceeds 2 equivalents.

The clear paint compositions of this invention can be used as they are or with the addition, as required, of organic solvents and various additives, such as ultraviolet absorbers, photo-stabilizers, antioxidants, surfactants, surface controlling agents, hardening reaction catalysts, anti-static agents, perfumes, water removing agents and rheology-controlling agents such as polyethylene wax, polyamide wax and fine internally crosslinked resin particles for example.

The aforementioned components are adjusted in such a way that the clear paint compositions of this invention can provide hardened paint films of which the Young's modulus is not more than 1.5 Pa, preferably from 0.01 to 1.2 Pa and most desirably from 0.1 to 1.0 Pa, the molecular weight of intercrosslinking of the cured coating. (Mc) is not more than 350 g/mol and preferably from 300 to 350 g/mol, and the glass transition temperature (Tg) of the hardened paint film is at least 65° C. and preferably from 65 to 90° C. In those cases where the Young's modulus of the hardened paint film is less than 0.01 Pa the dirt-soiling resistance and the weather resistance are poor and in those cases where the Young's modulus exceeds 1.5 Pa the scratch resistance is poor. Furthermore, in those cases where the molecular weight between crosslinks of the hardened paint film is less than 300 the scratch resistance is poor and in those cases where it exceeds 350 the dirt-soiling resistance and the weather resistance are poor. Furthermore, in those cases where the glass transition temperature (Tg) is less than 65° C. the dirt-soiling resistance and weather resistance are poor and in those cases where it exceeds 90° C. the scratch resistance is poor.

The method of measuring Young's modulus in this invention is that calculated from the chart measured an isolated paint film at 20° C. with a tensioning rate of 10% of the length of the sample length per minute with a tensile testing machine (trade name Tensilon/UTM-III-200, produced by the Toyo Baldwin Co.). That is to say, in a case where the isolated paint film sample was 40 mm it was tensioned in such a way that the paint film was stretched at 4 mm per minute. A larger measured value obtained indicates that it is harder.

The molecular weight of intercrosslinking of the cured coating film (Mc) is the value obtained from the dynamic rigidity modulus in the rubber region on measuring an isolated paint film at a frequency of 110 Hz with a temperature raising rate of 2° C./minute using enforced stretching and contracting oscillation type viscosity measuring apparatus (trade name Rheovibron DDV-1'-EA, produced by the Toyo Baldwin Co.) and it is expressed by the following equation:

$$Mc = 293 \times \rho/(\log_{10} G' - 7)$$

Here Mc is the molecular weight between crosslinks (g/mol), $\rho$ is the paint film density (g/cm$^3$), G' is the dynamic rigidity (E'/3 (10$^{-9}$ N/m$^2$)) in the rubber region and E' is the dynamic elastic modulus (10$^{-9}$ N/m$^2$) in the rubber region.

The glass transition point (Tg) is the value obtained from the maximum point of tan δ on measuring an isolated paint film at a frequency of 110 Hz at a temperature rising rate of 2° C./minute using enforced stretching and contracting oscillation type viscosity measuring apparatus (trade name Rheovibron DDV-1'-EA, produced by the Toyo Baldwin Co.).

The painting and finishing method for a clear paint composition of this invention is, for example, a two-coat one-bake painting and finishing method in which a colored base-coat is painted on the base material and said clear paint composition is painted on as a clear paint without crosslinking or an over-coating painting and finishing method where a colored base-coat is painted on the base material and a clear paint is painted on without crosslinking and, after baking both at the same time, said clear paint composition is painted on as an over-coat clear paint and baked, and there are also painting and finishing methods where in the abovementioned over-coating painting and finishing method a transparent primer paint is painted on to ensure adhesion with the underlying clear coat and said clear paint composition is painted on as an over-coat clear paint without crosslinking.

The aforementioned colored base coat paint, clear paint, over-coating clear paint and transparent primer paint are adjusted to the prescribed viscosity by heating or adding an organic solvent or reactive diluent, as required, and the painting is then carried out using a painting machine of the type generally used such as an air sprayer, electrostatic air sprayer, roll coater, flow coater or dipping system for example, or using a brush or a bar coater or an applicator, for example. From among these methods spray painting is preferred.

Furthermore, examples of the base material on which a clear paint composition of this invention is painted include organic materials and inorganic materials such as wood, glass, metal, cloth, plastics, foams, elastomers, paper, ceramics, concrete and plasterboard. These base materials may be materials which have been surface treated beforehand or they may be materials on which a paint film has been formed on the surface beforehand.

Actual examples have been indicated so far, but the method of painting and finishing a clear paint composition of this invention is not limited to just these methods.

No particular limitation is imposed upon the thickness of the paint film obtained by painting with a clear paint composition of this invention but generally the paint film thickness after drying is preferably from 10 to 150 μm, and more desirably from 10 to 100 μm.

Examples of painted objects which can be obtained with a clear paint composition of this invention include structures, wooden products, metal products, plastic products, rubber products, processed paper, ceramic products, and glass products. In more practical terms these include automobiles, automobile parts (for example bodies, bumpers, spoilers, mirrors, wheels, internal decorative parts and those made of various materials), metal sheets such as steel sheet, bicycles, bicycle parts, street furnishings (for example, guard rails, traffic signs and sound-deadening walls), tunnel furnishings (for example side-wall sheets), ships, railway rolling stock, aircraft, furniture, musical instruments, domestic electrical goods, building materials, containers, office equipment, sports goods, toys and the like.

EXAMPLES

The invention is described in more practical terms below by means of illustrative examples, but the invention is in no way limited by these illustrative examples. Moreover, the performance of the paint films obtained with the clear paint compositions of this invention was determined in the ways indicated below.

(1) Scratch Resistance Against Car Washing Machine

Scratch Resistance: Muddy water (JIS Z-8901-84 a 10/99/1 mixture of type 8 dust/water/neutral detergent) was applied with a brush to a test sheet and then it was cleaned with a car-wash brush rotating at 150 rpm for 10 seconds in an automatic car-wash machine and the test sheet was rinsed with flowing water. This procedure was repeated ten times and then the extent of scratching of the test sheet surface was determined by measuring the L* value with a color difference meter (CR-331, produced by the Minolta Camera Co.). A low numerical value is good.

(2) Dirt-Soiling Resistance

Dirty water (JIS Z-8901-84 a 1.3/98/0.5/0.2 by mass mixture of type 8 dust/water/carbon black/yellow ochre) was coated onto a test sheet and then dried for 10 minutes at 50° C. and, after carrying out eight of these cycles, the paint film was cleaned with a fixed force with a polishing cloth while rinsing with water and the staining mark was assessed visually, and evaluated on the basis of the following criteria.

○: No staining
Δ: Staining material remained in parts
X: Staining material remained all over (3) Weather Resistance The state of the paint film was assessed visually after being exposed for 3000 hours using a sunshine carbon arc lamp type accelerated weather resistance testing machine (JIS K-5400 (1990) 9.8.1).

Examples of Production 1 and 3 to 6

The Production of the Resin Solutions for Hydroxy Group-Containing-Paint Purposes A-1 and A-3 to A-6

The xylene of the composition shown in Table 1 was introduced into a four-necked flask which had been furnished with a thermometer, a reflux condenser, a stirrer and a dropping funnel and heated while being stirred under a current of nitrogen and maintained at 140° C. Next, the mixture of monomer and polymerization initiator of the composition shown in Table 1 (the drip-feed component) was drip fed at a uniform rate from the dropping funnel over a period of 2 hours at a temperature of 140° C. After the drip-feed had been completed the temperature of 140° C. was maintained for 1 hour and then the reaction temperature was lowered to 110° C. Subsequently, a polymerization initiator solution of the composition shown in Table 1 (the supplementary catalyst) was added and, after maintaining a temperature of 110° C. for 2 hours, the amount of ε-caprolactone indicated in Table 1 was introduced and the reaction was completed on maintaining a temperature of 150° C. for 3 hours and the resin solution for hydroxy group-containing paint purposes A-1 was obtained. Furthermore, A-3 to A-6 were the same as A-1 except that the amount of raw material introduced shown in Table 1 was changed and the resin solutions for hydroxy group-containing paint purposes A-3 to A-6 were obtained.

TABLE 1

|  |  | Example of Preparation | | | | | | | |
|---|---|---|---|---|---|---|---|---|---|
|  |  | 1 | 2 | 3 | 4 | 5 | 6 | 7 | 8 |
| Hydroxy group-containing resin solution | | A-1 | A-2 | A-3 | A-4 | A-5 | A-6 | A-7 | A-8 |
| Initial | Xylene | 36.8 | 36.6 | 36.7 | 36.7 | 33.0 | 37.3 | 36.4 | 36.2 |
| Introduction | 2,2-Dimethylolbutanoic acid | — | 16.5 | — | — | — | — | 12.8 | 20.1 |
| Monomers | Butyl acrylate | 2.7 | 3.3 | 11.0 | 8.7 | 2.7 | 2.7 | 1.4 | — |
|  | 2-Hydroxyethyl methacrylate | 33.3 | — | 25.0 | 33.3 | 33.3 | 33.3 | — | — |
|  | Glycidyl methacrylate | — | 16.2 | — | — | — | — | 12.8 | 20.1 |
|  | t-Butylperoxy-2-ethylhexanoate | 1.2 | 1.4 | 1.2 | 1.2 | 5.0 | 0.7 | 1.5 | 1.5 |
| Supplementary | t-Butylperoxy-2-ethylhexanoate | 0.1 | 0.1 | 0.1 | 0.1 | 0.1 | 0.1 | 0.1 | 0.1 |
| Catalyst | Xylene | 1.0 | 1.0 | 1.0 | 1.0 | 1.0 | 1.0 | 1.0 | 1.0 |
| Supplementary | ε-Caprolactone | 24.0 | 24.0 | 24.0 | 18.0 | 24.0 | 24.0 | 33.0 | 33.0 |
| Component | Xylene | 1.0 | 1.0 | 1.0 | 1.0 | 1.0 | 1.0 | 1.0 | 1.0 |
| Total | | 100.0 | 100.0 | 100.0 | 100.0 | 100.0 | 100.0 | 100.0 | 100.0 |
| Resin hydroxyl group value (mgKOH/g) | | 240 | 310 | 180 | 240 | 240 | 240 | 240 | 369 |
| Nonvolatile matter (wt %) | | 61 | 61 | 61 | 61 | 65 | 61 | 62 | 62 |
| Weight average molecular weight | | 9,100 | 9,300 | 8,900 | 9,000 | 3,200 | 17,100 | 9,100 | 9,300 |
| Amount of ε-caprolactone in resin solid fraction (wt %) | | 39.3 | 39.3 | 39.3 | 29.5 | 36.9 | 39.3 | 53.2 | 32.3 |

Examples of Production 2, 7 and 8

The Production of the Resin Solutions for Hydroxy Group-Containing Paint Purposes A-2, A-7 and A-8

The xylene and 2,2-dimethylolbutanoic acid of the compositions shown in Table 1 were introduced into a four-necked flask which had been furnished with a thermometer, a reflux condenser, a stirrer and a dropping funnel and heated while being stirred under a current of nitrogen and maintained at 140° C. Next, the mixtures of monomer and polymerization initiator of the compositions shown in Table 1 (the drip-feed component) were drip fed at a uniform rate from the dropping funnel over a period of 2 hours at a temperature of 140° C. After the drip-feeds had been completed the temperature of 140° C. was maintained for 1 hour and then the reaction temperature was lowered to 110° C. Subsequently, the polymerization initiator solutions of the compositions shown in Table 1 (the supplementary catalyst) were added and, after maintaining a temperature of 110° C. for 2 hours, the ε-caprolactone indicated in Table 1 was introduced and the reactions were completed on maintaining a temperature of 150° C. for 3 hours and the resin solutions for hydroxy group-containing paint purposes A-2, A-7 and A-8 were obtained.

Examples of Production 9 to 20

The Production of the Clear Paints CC-1 to CC-12

The raw materials shown in Tables 2 and 3 were mixed sequentially and stirred in such a way that uniform mixtures were obtained to prepare clear paints.

TABLE 2

| | | Example of Production | | | |
|---|---|---|---|---|---|
| | | 9 | 10 | 11 | 12 |
| Clear Paint | | CC-1 | CC-2 | CC-3 | CC-4 |
| Hydroxy Group-Containing Acrylic Resin | A-1 | 35.4 | — | 44.2 | 25.0 |
| | A-2 | — | 30.7 | — | — |
| | A-3 | — | — | — | — |
| | A-4 | — | — | — | — |
| | A-5 | — | — | — | — |
| | A-6 | — | — | — | — |
| | A-7 | — | — | — | — |
| | A-8 | — | — | — | — |
| Crosslinking agent (Sumidure HT-1) | | 29.3 | 33.1 | 22.0 | 37.3 |
| Ultraviolet absorber solution 2) | | 1.5 | 1.5 | 1.5 | 1.5 |
| Photo-stabilizer solution 3) | | 1 | 1 | 1 | 1 |
| Surface controlling agent solution 4) | | 0.4 | 0.4 | 0.4 | 0.43 |
| Solvesso 100 5) | | 32.4 | 33.3 | 30.9 | 34.8 |
| Total | | 100.0 | 100.0 | 100.0 | 100.0 |
| Equivalent ratio of NCO groups of the (B) component with respect to the hydroxyl groups of the (A) component | | 1.0 | 1.0 | 0.6 | 1.8 |

TABLE 3

| | | Example of Production | | | | | | | |
|---|---|---|---|---|---|---|---|---|---|
| | | 13 | 14 | 15 | 16 | 17 | 18 | 19 | 20 |
| Clear Paint | | CC-5 | CC-6 | CC-7 | CC-8 | CC-9 | CC-10 | CC-11 | CC-12 |
| Hydroxy Group-Containing Acrylic Resin | A-1 | — | — | — | — | — | — | 54.7 | 20.0 |
| | A-2 | — | — | — | — | — | — | — | — |
| | A-3 | 40.0 | — | — | — | — | — | — | — |
| | A-4 | — | 35.4 | — | — | — | — | — | — |
| | A-5 | — | — | 35.4 | — | — | — | — | — |
| | A-6 | — | — | — | 35.4 | — | — | — | — |
| | A-7 | — | — | — | — | 35.3 | — | — | — |
| | A-8 | — | — | — | — | — | 28.6 | — | — |
| Crosslinking agent HT 1) | | 24.8 | 29.3 | 29.3 | 29.3 | 29.5 | 34.8 | 13.6 | 41.4 |
| Ultraviolet absorber solution 2) | | 1.5 | 1.5 | 1.5 | 1.5 | 1.5 | 1.5 | 1.5 | 1.5 |
| Photo-stabilizer solution 3) | | 1 | 1 | 1 | 1 | 1 | 1 | 1 | 1 |
| Surface controlling agent solution 4) | | 0.4 | 0.4 | 0.4 | 0.4 | 0.4 | 0.4 | 0.4 | 0.4 |
| Solvesso 100 5) | | 32.3 | 32.4 | 32.4 | 32.4 | 32.3 | 33.7 | 28.8 | 35.7 |
| Total | | 100.0 | 100.0 | 100.0 | 100.0 | 100.0 | 100.0 | 100.0 | 100.0 |
| Equivalent ratio of NCO groups of the (B) component with respect to the hydroxyl groups of the (A) component | | 1.0 | 1.0 | 1.0 | 1.0 | 1.0 | 1.0 | 0.3 | 2.5 |

<<Notes for the Tables>>
1) Sumidure HT: Trade name, biuret type resin of liquid HDI (involatile fraction 75 wt %, NCO content 13 wt %), produced by the Sumika Beyer Urethane Co.
2) Tinuvin 900: Trade name, a 20 wt % xylene solution produced by the Ciba Specialty Chemicals Co.
3) Tinuvin 292: Trade name, a 20 wt % xylene solution produced by the Ciba Specialty Chemicals Co.
4) BYK-300: Trade name, a 10 wt % xylene solution produced by the Bikkukemi Co.
5) Solvesso 100: Trade name, aromatic petroleum naphtha, produced by the Esso Co.

Examples 1 to 4

Production of Test Specimens and Investigation of the Paint Film Performance The cationic electro-deposition paint Aqua No. 4200 (trade name, produced by the BASF Coatings Japan Co.) was electro-deposition painted so as to provide a dry film thickness of 20 μm on a zinc phosphate treated mild steel sheet and baked for 25 minutes at 175° C. and then the mid-coat paint HS-H300 (trade name, produced by the BASF Coatings Japan Co.) was air-spray painted so as to provide a dry film thickness of 30 μm and baked for 30 minutes at 140° C. Then Belcoat No. 6000 black (trade name, produced by the BASF coatings Japan Co., paint color: black) which is a solvent-based base-coat paint was air-spray painted in such a way as to provide a dry film thickness of 15 μm and, after setting for 3 minutes at 20° C., the clear paint CC-1 or CC-2 diluted with Sorbesso 100 (trade name, produced by the Esso Co., aromatic petroleum naphtha) to the painting viscosity (Ford cup No. 4, 25 seconds at 20° C.) was air-spray painted with a wet-on-wet system in such a way as to provide a dry film thickness of 40 μm and baked at 140° C. for 30 minutes to produce test specimens.

However, in both Example 1 to Example 4, for the staining resistance test sheets only the base-coat paint was replaced by Belcoat No. 6000 white (trade name, produced by the BASF Coatings Japan Co., paint color: white).

The paint film performances are shown in Table 4 and in all cases no paint turbidity arose and paint films with a uniform gloss were obtained, and they exhibited excellent car-wash damage resistance, staining resistance and weather resistance.

Comparative Examples 1 to 8

Preparation of Test Specimens and Investigation of the Paint Film Performance Test specimens were produced in the same way as in Example 1 except that the clear paints were CC-5 to CC-12. The paint film performances are shown in Table 5, and in Comparative Examples 1, 3 and 5 the staining resistance and the weather resistance were reduced and in Comparative Example 2 the car-wash damage resistance was poor. Furthermore, in Comparative Examples 4 and 6 the compatibility of the A and B components was poor.

Furthermore, in Comparative Example 7 where the amount of isocyanate compound was small the dirt-soiling resistance and the weather resistance were poor and in Comparative Example 8 where the amount was excessive the scratch resistance was reduced.

TABLE 4

|  |  | Example 1 | Example 2 | Example 3 | Example 4 |
|---|---|---|---|---|---|
| Clear Paint |  | CC-1 | CC-2 | CC-3 | CC-4 |
| Equivalent Ratio of NCO group of the B component with respect to the hydroxyl groups of the A component |  | 1.0 | 1.0 | 0.6 | 1.8 |
| Resin hydroxyl group value (mgKOH/g) |  | 240 | 310 | 240 | 240 |
| Amount of ε-caprolactone (wt %) |  | 39 | 39 | 39 | 39 |
| Weight average molecular weight of the A component |  | 9100 | 9300 | 9100 | 9100 |
| Compatibility of the A and B components |  | ○ | ○ | ○ | ○ |
| Hardened paint film properties | Young's modulus | 0.43 | 0.5 | 0.3 | 1.3 |
|  | Molecular weight of intercrosslinking of the cured coating film | 316 | 311 | 340 | 320 |
|  | Tg of the paint film | 66.2 | 76.2 | 66 | 75 |
|  | Scratch resistance against car washing machine | 0.2 | 0.8 | 0.3 | 1.2 |
|  | Dirt-soiling resistance | ○ | ○ | ○ | ○ |
|  | Weather resistance | No abnormality | No abnormality | No abnormality | No abnormality |

TABLE 5

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Clear Paint |  | CC-5 | CC-6 | CC-7 | CC-8 | CC-9 | CC-10 | CC-11 | CC-12 |
| Equivalent Ratio of NCO group of the B component with respect to the hydroxyl groups of the A component |  | 1.0 | 1.0 | 1.0 | 1.0 | 1.0 | 1.0 | 0.3 | 2.5 |
| Resin hydroxyl group value (mgKOH/g) |  | 180 | 240 | 240 | 240 | 240 | 350 | 240 | 240 |
| Amount of ε-caprolactone (wt %) |  | 39 | 30 | 37 | 39 | 53 | 32 | 39 | 39 |
| Weight average molecular weight of the A component |  | 8900 | 9000 | 3200 | 17100 | 9100 | 9300 | 9100 | 9100 |
| Compatibility of the A and B components |  | ○ | ○ | ○ | X | ○ | X | ○ | ○ |
| Hardened paint film properties | Young's modulus | 0.45 | 7.5 | 0.43 | — | 0.32 | — | 0.1 | 2 |
|  | Molecular weight of intercrosslinking of the cured coating film | 389 | 313 | 335 | — | 346 | — | 400 | 370 |
|  | Tg of the paint film | 60.1 | 68.5 | 62.3 | — | 58.6 | — | 55 | 95 |
|  | Scratch resistance against car washing machine | 0.2 | 7.5 | 0.1 | — | 0.1 | — | 1.3 | 8 |
|  | Dirt-soiling resistance | X | ○ | X | — | X | — | X | ○ |
|  | Weather resistance | Water marks | No abnormality | Water marks | — | Water marks | — | Water marks | No abnormality |

The clear paint compositions of this invention can be used as paints in various fields but in particular they can be used effectively as paints for vehicles such as automobiles and motorcycles.

What is claimed is:

1. A clear paint composition, comprising:
   (A) an acrylic copolymer comprising from 35 to 50 wt % ε-caprolactone structural units, based on the resin solid fraction, a hydroxyl group number of from 200 to 340 mg KOH/g and a weight average molecular weight of from 5,000 to 15,000, and
   (B) a non-yellowing type polyisocyanate compound, wherein the isocyanate group of the (B) component is included in a proportion of from 0.5 to 2 equivalents per 1 equivalent of hydroxyl group of the (A) component, and
   wherein the paint composition is hardened solely by baking, not hardening by ultraviolet radiation, such that the Young's modulus of the hardened paint film obtained from said paint composition is not more than 1.5 GPa, the molecular weight of intercrosslinking of the cured coating film (Mc) is not more than 350 g/mol, and the glass transition temperature (Tg) of the hardened paint film is at least 65° C.

2. A painted object obtained by painting an object with the paint composition of claim 1.

3. The clear paint composition of claim 1, wherein the acrylic copolymer (A) comprises from 37 to 47 wt % ε-caprolactone structural units, based on the resin solid fraction.

4. The clear paint composition of claim 1, wherein the acrylic copolymer (A) comprises from 39 to 45 wt % ε-caprolactone structural units, based on the resin solid fraction.

5. The clear paint composition of claim 1, wherein the hydroxyl group number of the acrylic copolymer (A) is from 220 to 320 mg KOH/g.

6. The clear paint composition of claim 1, wherein the weight average molecular weight of the acrylic copolymer (A) is from 7,000 to 13,000.

7. The clear paint composition of claim 1, wherein the non-yellowing type polyisocyanate compound is an aliphatic polyisocyanate, an alicyclic polyisocyanate, or a combination thereof.

8. The clear paint composition of claim 1, wherein the isocyanate group of the (B) component is included in a proportion of from 0.5 to 1.5 equivalents per 1 equivalent of hydroxyl group of the (A) component.

9. The clear paint composition of claim 1, wherein the isocyanate group of the (B) component is included in a proportion of from 0.6 to 1.2 equivalents per 1 equivalent of hydroxyl group of the (A) component.

10. The painted object of claim 2, wherein the object is selected from the group consisting of structures, wooden products, metal products, plastic products, rubber products, processed paper, ceramic products, glass products, automobiles, automobile parts, metal sheets, street furnishings, tunnel furnishings, ships, railway rolling stock, aircraft, furniture, musical instruments, domestic electrical goods, building materials, containers, office equipment, sports goods, and toys.

11. A clear paint composition, comprising:
(A) an acrylic copolymer comprising from 35 to 50 wt % ε-caprolactone structural units, based on the resin solid fraction, a hydroxyl group number of from 200 to 340 mg KOH/g and a weight average molecular weight of from 5,000 to 15,000, and
(B) a non-yellowing type polyisocyanate compound,
wherein the acrylic copolymer is a product of a ring-opening addition of ε-caprolactone by (1) a method in which ε-caprolactone is caused to undergo ring-opening addition with a hydroxy group-containing radically polymerizable monomer and used as a caprolactone modified radically polymerizable monomer in copolymerization, (2) a method in which ε caprolactone is added with ring-opening to a copolymer of hydroxy group-containing radically polymerizable monomer and other vinyl monomer during a copolymerization reaction or after the copolymerization reaction, and not by a method in which ε-caprolactone is added with ring-opening to a dimethylolalkanoic acid and an addition reaction is carried out with a homopolymer of a mono-(meth)acrylate which has an epoxy group,
wherein the isocyanate group of the (B) component is included in a proportion of from 0.5 to 2 equivalents per 1 equivalent of hydroxyl group of the (A) component, and
wherein the paint composition is hardened solely by baking, not hardening by ultraviolet radiation, such that the Young's modulus of the hardened paint film obtained from said paint composition is not more than 1.5 GPa, the molecular weight of intercrosslinking of the cured coating film (Mc) is not more than 350 g/mol, and the glass transition temperature (Tg) of the hardened paint film is at least 65° C.

12. A clear paint composition, comprising:
(A) an acrylic copolymer consisting of
from 35 to 50 wt % ε-caprolactone structural units, based on the resin solid fraction,
a hydroxy group-containing radically polymerizable monomer selected from the group consisting of 2-hydroxyethyl(meth)acrylate, 2-hydroxypropyl(meth)acrylate, 3-hydroxypropyl(meth)acrylate, 4-hydroxybutyl(meth)acrylate, polyethylene glycol mono-(meth)acrylate, polypropylene glycol mono-(meth)acrylate, neopentyl glycol mono-(meth)acrylate, glycerine mono-(meth)acrylate, and combinations thereof, and
optionally a copolymerizable vinyl monomer selected from the group consisting of (meth)acrylic acid, alkyl (meth)acrylates, esters of itaconic acid, maleic acid and fumaric acid, styrene, ring-substituted styrenes, (meth)acrylonitrile, (meth)acrylamide, vinyl acetate, vinyl chloride, and combinations thereof,
having a hydroxyl group number of from 200 to 340 mg KOH/g and a weight average molecular weight of from 5,000 to 15,000, and
(B) a non-yellowing type polyisocyanate compound,
wherein the isocyanate group of the (B) component is included in a proportion of from 0.5 to 2 equivalents per 1 equivalent of hydroxyl group of the (A) component, and
wherein the paint composition is hardened solely by baking, not hardening by ultraviolet radiation, such that Young's modulus of the hardened paint film obtained from said paint composition is not more than 1.5 GPa, the molecular weight of intercrosslinking of the cured coating film (Mc) is not more than 350 g/mol, and the glass transition temperature (Tg) of the hardened paint film is at least 65° C.

13. The clear paint composition of claim 12, wherein the alkyl(meth)acrylates are methyl(meth)acrylate, ethyl(meth)acrylate, butyl(meth)acrylate, 2-ethylhexyl(meth)acrylate, lauryl(meth)acrylate and stearyl(meth)acrylate, and the ring-substituted styrenes are vinyltoluene, dimethylstyrene, and ethylstyrene.

* * * * *